United States Patent [19]

Otsuka et al.

[11] 4,383,409

[45] May 17, 1983

[54] AIR/FUEL RATIO CONTROL SYSTEM FOR INTERNAL COMBUSTION ENGINES, HAVING FUNCTION OF DETECTING AIR/FUEL RATIO CONTROL INITIATING TIMING

[75] Inventors: Kazuo Otsuka, Higashikurume; Shin Narasaka, Yono; Shumpei Hasegawa, Niiza, all of Japan

[73] Assignee: Honda Motor Co., Ltd., Tokyo, Japan

[21] Appl. No.: 284,225

[22] Filed: Jul. 17, 1981

[30] Foreign Application Priority Data

Jul. 23, 1980 [JP] Japan .............................. 55-100808

[51] Int. Cl.³ .......................... F02B 75/10; F02M 7/00
[52] U.S. Cl. .............................. 60/276; 60/284; 60/285; 60/289; 123/440; 123/479
[58] Field of Search ............. 60/276, 284, 285, 289; 123/440, 489, 585, 479

[56] References Cited

U.S. PATENT DOCUMENTS

| 3,948,228 | 4/1976 | Luchaco | 60/276 |
| 4,132,200 | 1/1979 | Asano | 60/276 |
| 4,155,335 | 5/1979 | Hosaka | 60/276 |
| 4,167,396 | 9/1979 | Kondo | 60/285 |
| 4,226,221 | 10/1980 | Asano | 123/440 |
| 4,237,829 | 12/1980 | Asano | 123/440 |
| 4,244,340 | 1/1981 | Herth | 123/440 |

*Primary Examiner*—Douglas Hart
*Attorney, Agent, or Firm*—Arthur L. Lessler

[57] ABSTRACT

An air/fuel ratio control system for use with an internal combustion engine, which comprises $O_2$ sensor activation determining means having a comparator and a timer and adapted to determine the activation of an $O_2$ sensor for detecting oxygen concentration in engine exhaust gases, to produce an output upon determining the activation, engine temperature determining means adapted to produce an output when an engine temperature detected by an engine temperature sensor exceeds a predetermined value, and signal generating means adapted to produce a feedback control initiating signal when supplied with both of the above outputs, whereby air/fuel ratio control operation can be initiated at an appropriate time. Further provided is means for supplying secondary air to the exhaust system of the engine, which is arranged to be rendered inoperative by the above feedback control initiating signal. Also provided is failure determining means which is operable to produce an output after the engine temperature determining means has continued producing its output for a predetermined period of time when no output is produced by the $O_2$ sensor activation determining means.

3 Claims, 3 Drawing Figures

AIR/FUEL RATIO CONTROL SYSTEM FOR INTERNAL COMBUSTION ENGINES, HAVING FUNCTION OF DETECTING AIR/FUEL RATIO CONTROL INITIATING TIMING

BACKGROUND OF THE INVENTION

This invention relates to a system for control of the air/fuel ratio of an air/fuel mixture being supplied to an internal combustion engine, and more particularly to a device provided in such system for determining the timing of initiation of the air/fuel ratio control operation of the system.

A system is already known which is arranged to effect feedback control of the air/fuel ratio of a mixture being supplied to an internal combustion engine which has a three-way catalyst provided in its exhaust system, in response to an output signal of an exhaust gas ingredient concentration sensor provided in the same exhaust system. As the above sensor, an $O_2$ sensor is used in general which comprises a sensor element made of zirconium oxide and is adapted to detect the concentration of oxygen present in the engine exhaust gases.

The principle of the $O_2$ sensor is utilization of a change in the conduction rate of oxygen ions through the interior of the zirconium oxide, which corresponds to a change in the difference between the oxygen partial pressure of the air and the equilibrium partial pressure of the oxygen in the exhaust gases. The internal resistance of the $O_2$ sensor is determined by the oxygen conduction rate through the zirconium oxide, so that the output voltage produced by the sensor varies as a function of the oxygen concentration in the exhaust gases. Further, the internal resistance of the $O_2$ sensor also varies with a change in the degree of activation of the sensor. Thus, for accurate air/fuel ratio feedback control, the feedback control operation has to be initiated only after the $O_2$ sensor has become fully activated.

On the other hand, in an internal combustion engine in general, a choke valve is usually provided in an air intake of the carburetor for supplying the engine with a rich mixture at the cold start of the engine or on like occasions. If the choke valve is an automatic choke which is automatically opened or closed, depending upon a change in the engine temperature, the choke valve is closed at the start of the engine when the engine temperature is low, to supply the engine with a rich mixture. However, if air/fuel ratio control operation is carried out at the start of the engine when the choke valve is still closed, the choke valve cannot exhibit its proper function, since the air/fuel ratio of the mixture being supplied to the engine is then controlled to a value nearly equal to the theoretical air/fuel ratio. Therefore, it is desirable to initiate the air/fuel ratio control operation after the engine temperature, which forms the factor for actuation of the choke valve, has risen to a predetermined value.

OBJECTS AND SUMMARY OF THE INVENTION

It is a primary object of the invention to provide an air/fuel ratio control system for use with an internal combustion engine, which is provided with a function of determining the timing of initiation of the air/fuel ratio control operation by accurately detecting the time of activation of the $O_2$ sensor and the time at which the engine has just come into a condition requiring the supply of a mixture having a theoretical air/fuel ratio thereto.

It is a further object of the invention to provide an air/fuel ratio control system for use with an internal combustion engine, which is capable of detecting failure of the $O_2$ sensor or its related parts with accuracy, and performing a fail safe function without fail upon occurrence of such a failure.

It is another object of the invention to provide an air/fuel ratio control system for use with an internal combustion engine, which is capable of supplying secondary air to the exhaust system of the engine during warming-up operation of the engine to allow a three-way catalyst provided in the exhaust system to operate under an oxidizing atmosphere to thereby largely reduce unburned ingredients in the exhaust gases, wherein during air/fuel ratio feedback control operation effected after completion of the warming up of the engine, the supply of secondary air is interrupted to thereby achieve an air/fuel ratio substantially equal to the theoretical mixture ratio.

According to the invention, there is provided an air/fuel ratio control system for performing feedback control of the air/fuel ratio of an air/fuel mixture being supplied to an internal combustion engine, which includes a three-way catalyst provided in the exhaust system of the engine, an $O_2$ sensor arranged between the engine and the three-way catalyst for detecting the concentration of oxygen present in the exhaust gases emitted from the engine, fuel quantity adjusting means for producing the mixture being supplied to the engine, and electrical circuit means operatively connecting the $O_2$ sensor with the fuel quantity adjusting means in a manner effecting feedback control operation in response to an output voltage produced by the $O_2$ sensor to control the air/fuel ratio of the mixture to a preset value. The air/fuel ratio control system is characterized by comprising in combination: means for supplying electric current to the $O_2$ sensor; means for determining the internal resistance of the $O_2$ sensor, which is operable to compare an output voltage produced by the $O_2$ sensor with a predetermined reference voltage to produce an output when the output voltage of the $O_2$ sensor decreases below the predetermined reference voltage; a timer circuit connected to the internal resistance determining means for producing an output after a lapse of a predetermined period of time from the occurrence of the output thereof; means for detecting the temperature of the engine; an engine temperature determining circuit connected to the engine temperature detecting means for producing an output when the engine temperature detected by the latter increases above a predetermined value; and means connected to the timer circuit and the engine temperature determining means for producing a signal for initiating the feedback control operation when supplied with both of the outputs therefrom.

Further provided is secondary air supply means arranged in communication with the exhaust system of the engine at a location upstream of the $O_2$ sensor. The secondary air supply means if electrically connected to the signal generating means to be rendered inoperative by the feedback control initiating signal supplied from the signal generating means. Also provided is fail safe means including a failure determining circuit which is adapted to produce an output after the engine temperature determining circuit has continuously produced its output for a predetermined period of time when no output is produced by the $O_2$ sensor internal resistance determining means.

The above and other objects, features and advantages of the invention will be more apparent from the ensuing detailed description taken in connection with the accompanying drawings in which:

DETAILED DESCRIPTION

The air/fuel ratio control system according to the invention will now be described in detail with reference to the accompanying drawings wherein an embodiment of the invention is illustrated.

Figure 1:
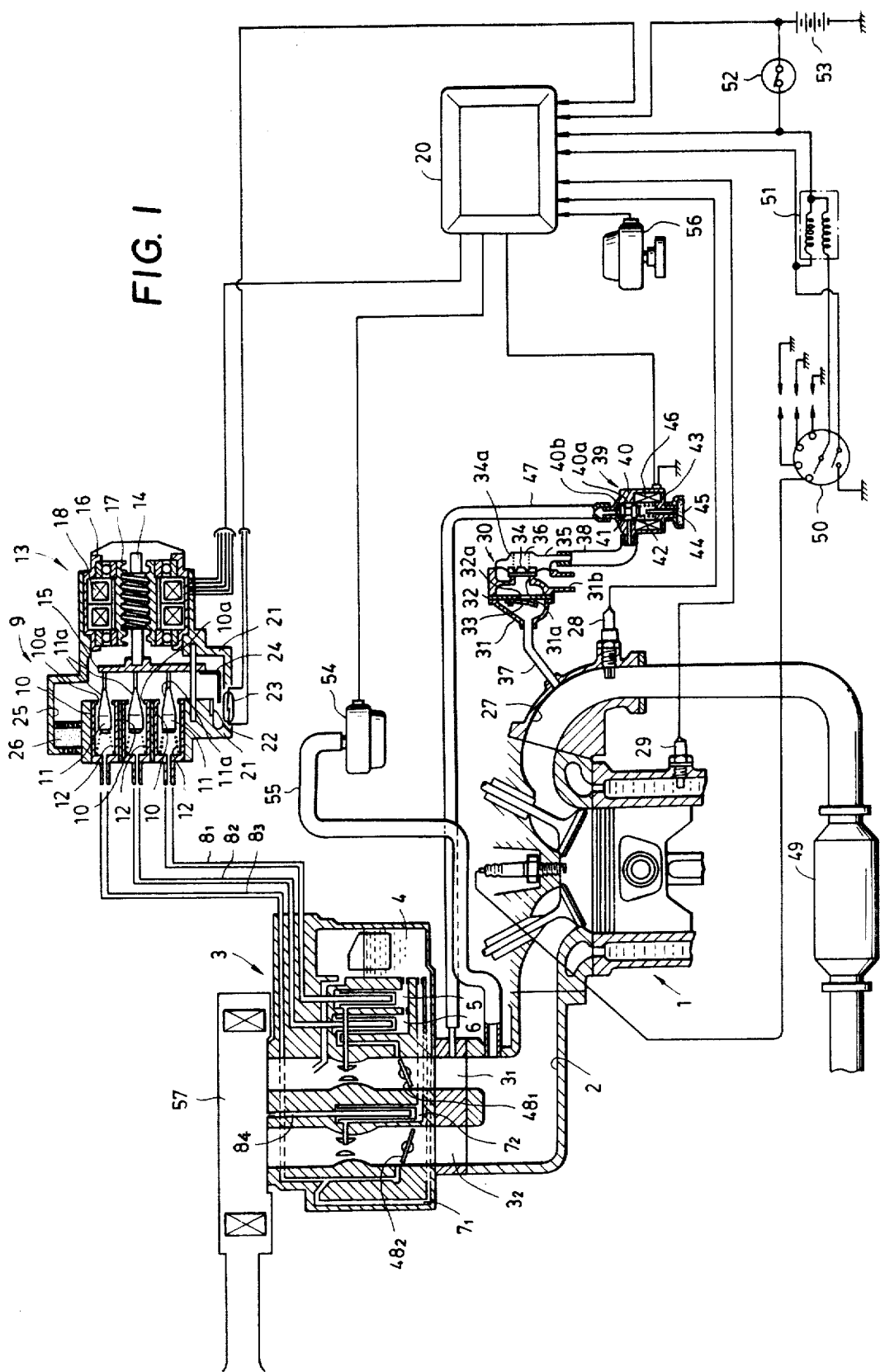
FIG. 1 is a diagrammatical view illustrating the whole arrangement of an air/fuel ratio control system according to an embodiment of the present invention.

Referring now to FIG. 1, there is illustrated the whole system of the invention. Reference numeral 1 designates an internal combustion engine. Connected to the engine 1 is an intake manifold 2 which is provided with a carburetor generally designated by the numeral 3. The carburetor 3 has fuel passages 5, 6 which communicate a float chamber 4 with the primary bore $3_1$ of the carburetor 3. These fuel passages 5, 6 are connected to an air/fuel ratio control valve generally designated by the numeral 9, via air bleed passages $8_1$, $8_2$. The carburetor 3 also has fuel passages $7_1$, $7_2$ communicating the float chamber 4 with the secondary bore $3_2$ of the carburetor 3. The fuel passage $7_1$, on one hand, is connected to the above air/fuel ratio control valve 9 via an air passage $8_3$ and, on the other hand, opens in the secondary bore at a location slightly upstream of a throttle valve $48_2$ in the secondary bore. The fuel passage $7_2$ communicates with the interior of an air cleaner 57 via an air passage $8_4$ having a fixed orifice. The control valve 9 is comprised of three flow rate control valves, each of which is formed of a cylinder 10, a valve body 11 displaceably inserted into the cylinder 10, and a coil spring 12 interposed between the cylinder 10 and the valve body 11 for urging the valve body 11 in a predetermined direction. Each valve body 11 is tapered along its end portion 11a remote from the coil spring 12 so that the effective opening area of the opening 10a of each cylinder 10, in which the tapered portion 11a of the valve body is inserted, varies as the valve body 11 is moved. Each valve body 11 is disposed in urging contact with a connection plate 15 coupled to a worm element 14 which is axially movable but not rotatable about its own axis. The worm element 14 is in threaded engagement with the rotor 17 of a pulse motor 13 which is arranged about the element 14 and rotatably supported by radial bearings 16. Arranged about the rotor 17 is a solenoid 18 which is electrically connected to an electronic control unit (hereinafter called "ECU") 20. The solenoid 18 is energized by driving pulses supplied from ECU 20 to cause rotation of the rotor 17 which in turn causes movement of the worm element 14 threadedly engaging the rotor 17 in the leftward and rightward directions as viewed in FIG. 1. Accordingly, the connection plate 15 coupled to the worm element 14 is moved leftward and rightward in unison with the movement of the worm element 14.

The pulse motor 13 has its stationary housing 21 provided with a permanent magnet 22 and a reed switch 23 arranged opposite to each other. The plate 15 is provided at its peripheral edge with a magnetic shielding plate 24 formed of a magnetic material which is interposed between the permanent magnet 22 and the reed switch 23 for movement into and out of the gap between the two members 22, 23. The magnetic shielding plate 24 is displaced in the leftward and rightward directions in unison with displacement of the plate 15 in the corresponding directions. The reed switch 23 turns on or off in response to the displacement of the plate 24. That is, when the valve body 11 of the air/fuel ratio control valve 9 passes a reference position which is determined by the positions of the permanent magnet 22, reed switch 23 and magnetic shielding plate 24, the reed switch 23 turns on or off depending upon the moving direction of the valve body 11, to supply a corresponding binary output signal to ECU 20.

Incidentally, the pulse motor housing 21 is formed with an air intake 25 communicating with the atmosphere. Air is introduced through a filter 26 mounted in the air intake 25, into each flow rate control valve in the housing 21.

An $O_2$ sensor 28 is provided at the exhaust manifold 27 of the engine 1 in a manner partly inwardly projecting from the inner wall of the manifold, to detect the concentration of an ingredient, i.e., oxygen present in the exhaust gases, an output of which is supplied to ECU 20. A thermistor 29, which is used as an engine temperature sensor, is partly inserted in the peripheral wall of the engine cylinder which is filled with cooling water, an output of which is supplied to ECU 20, too. Further provided is a secondary air supply valve 30 which is arranged in communication with the exhaust manifold 27 at a location upstream of the $O_2$ sensor 28. The valve 30 has a casing 31 within which is mounted a plate 32 formed with a through bore 32a. A reed 33 is secured at its one end to one side face of the plate 32 so as to close the through bore 32a. The casing 31 has its one side wall formed with an opening 31a which is closable by a diaphragm 34 mounted at an end of the casing 31. The diaphragm 34 cooperates with a cover 35 mounted on the above end of the casing 31 to define a negative pressure chamber 36 therebetween. A coil spring 34a is mounted within the chamber 36 in a manner urging the diaphragm 34 against the opening 31a. The casing 31 is further formed with an air intake 31b communicating with the air cleaner 57 so that atmospheric air is introduced into the casing 31 through the opening 31a when the diaphragm 34 is retracted away from the opening 31a. The casing 31 has an open end wall remote from the diaphragm 34, through which it communicates with the interior of the exhaust manifold 27 at a location upstream of the $O_2$ sensor 28, by means of a conduit 37. The negative pressure chamber 36 communicates with a valve bore 40a formed in the casing 40 of a solenoid controlled valve 39, by means of a conduit 38. Arranged within the valve bore 40a is a valve body 41 made of a magnetic material, which has its one end disposed for urging contact with a valve seat portion 40b formed in the casing 40 by the action of a coil spring 42. The coil spring 42 is seated on a spring seat portion 43 formed in the casing 40, which portion is penetrated by a tubular member 44 which has its inner end disposed for urging contact with the other end of the valve body 41 and communicates at its outer end with atmospheric air through a filter 45. Arranged around the valve bore 40a of the casing 40 is a solenoid 46 which is connected to ECU 20 to be energized by a control signal supplied therefrom. A conduit 47 is connected at its one end to the valve bore 40a and has its other end opening in the inner wall of the intake manifold 2 at a location downstream of a throttle valve 48₁ in the primary bore.

When the solenoid 46 is deenergized, the valve body 41 is pushed by the spring 42 to be seated on the valve seat portion 40b to close the associated end of the conduit 47, while simultaneously air is introduced into the negative pressure chamber 36 through the filter 45, the tubular member 44, the valve bore 40a and the conduit 38 to cause the diaphragm 34 to be urgedly displaced by the spring 34a to close the opening 31a, whereby no air is supplied into the exhaust manifold 27 through the reed valve 30. On the other hand, when the solenoid 46 is energized, the valve body 41 is magnetically attracted and drawn toward the spring seat 43 made of a magnetic material to allow the valve bore 40a to communicate with the conduit 47, while simultaneously the tubular member 44 has its interior blocked by the associated end of the valve body 41 so that negative pressure produced in the intake manifold 2 at a zone downstream of the throttle valve 48₁ is introduced into the negative pressure chamber 36 through the conduit 47, the valve bore 40a and the conduit 38 to force the diaphragm 34 to be retracted against the force of the spring 34a, thus allowing air to be supplied into the exhaust manifold 27 through the air intake 31b, the opening 31a, and then through the through bore 32a in the plate 32 in the casing 31 and the conduit 37.

Incidentally, in FIG. 1, reference numeral 49 designates a three-way catalyst arranged in the exhaust manifold 27 for purifying HC, CO, NOx in the exhaust gases, 50 a distributor, 51 ignition coils, 52 an ignition switch which also serves as the power switch of ECU 20, 53 a car battery which also serves as the power supply for ECU 20, 54 a pressure sensor arranged to detect absolute pressure in the intake manifold 2 through a conduit 55, an output of which is supplied to ECU 20, and 56 an atmospheric pressure sensor, respectively.

Details of the air/fuel ratio control which can be performed by the air/fuel ratio control system according to the invention will now be described by further reference to FIG. 1 which has been referred to hereinabove.

INITIALIZATION

Referring first to the initialization, when the ignition switch 52 in FIG. 1 is set on, ECU 20 is initialized to detect the reference position of the actuator or pulse motor 13 by means of the reed switch 23 and hence drive the pulse motor 13 to set it to its best position (a preset position) for starting the engine, that is, set the initial air/fuel ratio to a predetermined proper value. The above preset position of the pulse motor 13 is hereinafter called "PS$_{CR}$". This setting of the initial air/fuel ratio is made on condition that the engine rpm Ne is lower than a predetermined value N$_{CR}$ (e.g., 400 rpm) and the engine is in a condition before firing. The predetermined value N$_{CR}$ is set at a value higher than the cranking rpm and lower than the idling rpm.

The above reference position of the pulse motor 13 is detected as the position at which the reed switch 23 turns on or off, as previously mentioned with reference to FIG. 1.

Then, ECU 20 monitors the condition of activation of the O₂ sensor 28 and the coolant temperature Tw detected by the thermistor 29 to determine whether or not the engine is in a condition for initiation of the air/fuel ratio control. For accurate air/fuel ratio feedback control, it is a requisite that the O₂ sensor 28 is fully activated and the engine is in a warmed-up condition. The O₂ sensor, which is made of stabilized zirconium dioxide or the like, has a characteristic that its internal resistance decreases as its temperature increases. If the O₂ sensor is supplied with electric current through a resistance having a suitable resistance value from a constant-voltage regulated power supply provided within ECU 20, the electrical potential or output voltage of the sensor initially shows a value close to the power supply voltage (e.g., 5 volts) when the sensor is not activated, and then, its electrical potential lowers with the increase of its temperature. Therefore, according to the invention, the air/fuel ratio feedback control is not initiated until after the conditions are fulfilled that the sensor produces an activation signal when its output voltage lowers down to a predetermined voltage Vx (e.g., 0.5 volts), a timer finishes counting for a predetermined period of time t$_x$ (e.g., 1 minute) starting from the occurrence of the above activation signal, and the coolant temperature Tw increases up to a predetermined value Twx at which the automatic choke is opened to an opening for enabling the air/fuel ratio feedback control. The reason for the provision of the above predetermined period of time t$_x$ for which the timer counts after the output potential of the O₂ sensor has reached the predetermined value Vx is that the predetermined value Vx is set at such a high value as to facilitate detecting activation of the O₂ sensor with high accuracy in view of the natures of an actually available comparator circuit and its related parts as well as the fact that the smaller the output voltage of the sensor the smaller the variation rate of the same output voltage relative to time during varming-up of the engine. The O₂ sensor is still inactive when its output voltage just reaches the predetermined value Vx. Thus, according to the invention, a suitable period of time has to lapse after the predetermined value Vx is reached, to ensure initiation of the air/fuel ratio feedback control only after the output voltage of the O₂ sensor has become fully low, that is, the O₂ sensor has been actually activated.

During warming-up of the engine, that is, when the O₂ sensor is inactive and the coolant temperature is low, unburned ingredients are emitted in large quantities from the engine. The secondary air valve 30 is opened during warming-up of the engine to cause the three-way catalyst 49 to operate under an oxydizing atmosphere to thereby largely reduce the amount of unburned exhaust components in the exhaust gases. Consequently, the detection of activation of the O₂ sensor is made in exhaust gases in a lean or high air/fuel ratio state.

During the above stage of the detection of activation of the O₂ sensor and the coolant temperature Tw, the pulse motor 13 is held at its predetermined position PS$_{CR}$. The pulse motor 13 is driven to appropriate positions in response to the operating condition of the engine after initiation of the air/fuel ratio control, as hereinlater described.

BASIC AIR/FUEL RATIO CONTROL

Following the initialization described above, the program proceeds to the basic air/fuel ratio control.

ECU 20 is responsive to various detected value signals representing the output voltage of the $O_2$ sensor 28, the absolute pressure in the intake manifold 2 detected by the pressure sensor 54, the engine rpm Ne detected by the rpm sensor 50, 51, and the atmospheric pressure $P_A$ detected by the atmospheric pressure sensor 56, to drive the pulse motor 13 as a function of these signals to control the air/fuel ratio. More specifically, the basic air/fuel ratio control comprises open loop control which is carried out at wide-open-throttle, at engine idle, and at engine deceleration, and closed loop control which is carried out at engine partial load. All the control is initiated after completion of the warming-up of the engine.

First, the condition of open loop control at wide-open-throttle is met when the differential pressure $P_A - P_B$ (gauge pressure) between the absolute pressure $P_B$ detected by the pressure sensor 54 and the atmospheric pressure $P_A$ (absolute pressure) detected by the atmospheric pressure sensor 56 is lower than a predetermined value $\Delta P_{WOT}$. ECU 20 compares the different in value between the output signals of the sensors 54, 56 with the predetermined value $\Delta P_{WOT}$ stored therein, and when the relationship of $P_A - P_B < \Delta P_{WOT}$ stands, drives the pulse motor 13 to a predetermined position (preset position) $PS_{WOT}$ and holds it there, which is a position best appropriate for the engine emissions to be obtained at the time of termination of the wide-open-throttle open loop control. At wide-open-throttle, a known economizer, not shown, or the like is actuated to supply a rich or small air/fuel ratio mixture to the engine.

The condition of open loop control at engine idle is met when the engine rpm Ne is lower than a predetermined idle rpm $N_{IDL}$ (e.g., 1,000 rpm). ECU 20 compares the output signal value Ne of the rpm sensor 50, 51 with the predetermined rpm $N_{IDL}$ stored therein, and when the relationship of $Ne < N_{IDL}$ stands, drives the pulse motor 13 to a predetermined idle position (preset position) $PS_{IDL}$ which is best suitable for the engine emissions and holds it there.

The condition of open loop control at engine deceleration is fulfilled when the absolute pressure $P_B$ in the intake manifold is lower than a predetermined value $PB_{DEC}$. ECU 20 compares the output signal value $P_B$ of the pressure sensor 54 with the predetermined value $PB_{DEC}$ stored therein, and when the relationship of $P_B < PB_{DEC}$ stands, drives the pulse motor 13 to a predetermined deceleration position (preset position) $PS_{DEC}$ best suitable for the engine emissions and holds it there.

The ground for this condition of open loop control at engine deceleration lies in that when the absolute pressure $P_B$ in the intake manifold drops below the predetermined value, unburned HC is produced at an increased rate in the exhaust gases, to make it impossible to carry out the air/fuel ratio feedback control based upon the detected value signal of the $O_2$ sensor with accuracy, thus failing to control the air/fuel ratio to a theoretical value. Therefore, according to the invention, the open loop control is employed, as noted above, when the absolute pressure $P_B$ in the intake manifold detected by the pressure sensor 54 is smaller than the predetermined value $PB_{DEC}$, where the pulse motor is set to the predetermined position $PS_{DEC}$ best suitable for the engine emissions obtained at the time of termination of the deceleration open loop control. At the beginning of engine deceleration, the shot air valve is actuated to supply air into the intake manifold to prevent the occurrence of unburned ingredients in the exhaust gases.

During operations of the above-mentioned open loop control at wide-open-throttle, at engine idle, at engine deceleration, the respective predetermined positions $PS_{WOt}$, $PS_{IDL}$, $PS_{DEC}$ for the pulse motor 13 are compensated for atmospheric pressure $P_A$, as hereinlater described.

On the other hand, the condition of closed loop control at engine partial load is met when the engine is in an operating condition other than the above-mentioned open loop control conditions. During the closed loop control, ECU 20 performs selectively feedback control based upon proportional term correction (hereinafter called "P term control") and feedback control based upon integral term correction (hereinafter called "I term control"), in response to the engine rpm Ne detected by the engine rpm sensor Ne and the output signal of the $O_2$ sensor 28. To be concrete, the integral term correction is used when the output voltage of the $O_2$ sensor 28 varies only at the higher level side or only at the lower level side with respect to a reference voltage Vref, wherein the position of the pulse motor 13 is corrected by an integral value obtained by integrating the value of a binary signal which changes in dependence on whether the output voltage of the $O_2$ sensor is at the higher level or at the lower level with respect to the predetermined reference voltage Vref, to thereby achieve stable and accurate position control of the pulse motor 13. On the other hand, when the output signal of the $O_2$ sensor changes from the higher level to the lower level or vice versa, the proportional term correction is carried out wherein the position of the pulse motor 13 is corrected by a value directly proportional to a change in the output voltage of the $O_2$ sensor to thereby achieve air/fuel ratio control in a manner prompter and more efficient than the integral term correction.

As noted above, according to the above I term control, the pulse motor position is varied by an integral value by integrating the value of a binary signal corresponding to the change of the output voltage of the $O_2$ signal. According to this I term control, the number of steps by which the pulse motor is to be displaced per second differs depending upon the speed at which the engine is then operating. That is, in a low engine rpm range, the number of steps by which the pulse motor is to be displaced is small. With an increase in the engine rpm, the above number of steps increases so that it is large in a high engine rpm range.

Whilst, according to the P term control which, as noted above, is used when there is a change in the output voltage of the $O_2$ sensor from the higher level to the lower one or vice versa with respect to the reference voltage Vref, the number of steps by which the pulse motor is to be displaced per second is set at a single predetermined value (e.g., 6 steps), irrespective of the engine rpm.

The air/fuel ratio control at engine acceleration (i.e., off-idle acceleration) is carried out when the engine rpm Ne exceeds the aforementioned predetermined idle rpm $N_{IDL}$ during the course of the engine speed increasing from a low rpm range to a high rpm range, that is, when the engine speed changes from a relationship $Ne < N_{IDL}$ to one $Ne \geq N_{IDL}$. On this occasion, ECU 20 rapidly moves the pulse motor 13 to a predetermined acceleration position (preset position) $PS_{ACC}$, and thereafter initiates the aforementioned air/fuel ratio feedback control. This predetermined position $PS_{ACC}$ is compensated for atmospheric pressure $P_A$, too, as hereinlater described.

The above-mentioned predetermined position $PS_{ACC}$ is set at a position where the amount of detrimental ingredients in the exhaust gases is small. Therefore, particularly at the so-called "standing start", i.e., acceleration from a vehicle-stopping position, setting the pulse motor position to the predetermined position $PS_{ACC}$ is advantageous to anti-exhaust measures, as well as to achievement of accurate air/fuel ratio feedback control to be done following the acceleration. This acceleration control is carried out under a warmed-up engine condition, too.

In transition from the above-mentioned various open loop control to the closed loop control at engine partial load or vice versa, changeover between open loop mode and closed loop mode is effected in the following manner: First, in changing from closed loop mode to open loop mode, ECU 20 moves the pulse motor 13 to an atmospheric pressure-compensated predetermined position $PSi$ $(P_A)$ in a manner referred to later, irrespective of the position at which the pulse motor was located immediately before entering the open loop control. This predetermined position $PSi$ $(P_A)$ includes preset positions $PS_{CR}$, $PS_{WOT}$, $PS_{IDL}$, $PS_{DEC}$ and $PS_{ACC}$, each of which is corrected in response to actual atmospheric pressure as hereinlater referred to. Various open loop control operations can be promptly done, simply by setting the pulse motor to the above-mentioned respective predetermined positions.

On the other hand, in changing from open loop mode to closed loop mode, ECU 20 commands the pulse motor 13 to initiate air/fuel ratio feedback control with I term correction. That is, there can be a difference in timing between the change of the output signal level of the $O_2$ sensor from the high level to the low level or vice versa and the change from the open loop mode to the closed loop mode. In such an event, the deviation of the pulse motor position from the proper position upon entering the closed loop mode, which is due to such timing difference, is much smaller in the case of initiating air/fuel ratio control with I term correction than that in the case of initiating it with P term correction, to make it possible to ressume early accurate air/fuel ratio control and accordingly ensure highly stable engine emissions.

To obtain optimum exhaust emission characteristics irrespective of changes in the actual atmospheric pressure during open loop air/fuel ratio control or at the time of shifting from open loop mode to closed loop mode, the position of the pulse motor 13 needs to be compensated for atmospheric pressure. According to the invention, the above-mentioned predetermined or preset positions $PS_{CR}$, $PS_{WOT}$, $PS_{IDL}$, $PS_{DEC}$, $PS_{ACC}$ at which the pulse motor 13 is to be held during the respective open loop control operations are corrected in a linear manner as a function of changes in the atmospheric pressure $P_A$, using the following equation:

$$PSi(P_A) = PSi + (760 - P_A) \times Ci$$

where i represents any one of CR, WPT, ODL, DEC and ACC, accordingly PSi represents any one of $PS_{CR}$, $PS_{WOT}$, $PS_{IDL}$, $PS_{DEC}$ and $PS_{ACC}$ at 1 atmospheric pressure ($=760$ mmHg), and Ci a correction coefficient, representing any one of $C_{CR}$, $C_{WOT}$, $C_{IDL}$, $C_{DEC}$ and $C_{ACC}$. The values of PSi and Ci are previously stored in ECU 20.

ECU 20 applies to the above equation the coefficients PSi, Ci which are determined at proper different values according to the kinds of open loop control to be carried out, to calculate by the above equation the position PSi $(P_A)$ for the pulse motor 13 to be set at a required kind of open loop control and moves the pulse motor 13 to the calculated position PSi $(P_A)$.

By correcting the air/fuel ratio during open loop control in response to the actual atmospheric pressure in the above-mentioned manner, it is possible to obtain not only conventionally known effects such as best driveability and prevention of burning of the ignition plug in an engine cylinder, but also optimum emission characteristics by setting the value of Ci at a suitable value, since the pulse motor position held during open loop control forms an initial position upon entering subsequent closed loop control.

The position of the pulse motor 13 which is used as the actuator for the air/fuel ratio control valve 9 is monitored by a position counter provided within ECU 20. However, there can occur a disagreement between the counted value of the position counter and the actual position of the pulse motor due to skipping or racing of the pulse motor. In such an event, ECU 20 operates on the counted value of the position counter as if it were the actual position of the pulse motor 13. However, this can impede proper setting of the air/fuel ratio during open loop control where the actual position of the pulse motor 13 must be accurately recognized by ECU 20.

In view of the above disadvantage, according to the air/fuel ratio control system of the invention, as previously mentioned, in addition to detection of the initial position of the pulse motor 13 by regarding as the reference position (e.g., 50th step) the position of the pulse motor at which the reed switch 23 turns on or off when the pulse motor is driven, which was previously noted with reference to the initialization, the position counter has its counted value replaced by the number of steps corresponding to the reference position (e.g., 50 steps) stored in ECU 20 upon the pulse motor 13 passing the switching point of the reed switch 23, to thus ensure high reliability of subsequent air/fuel ratio control.

Figure 2:
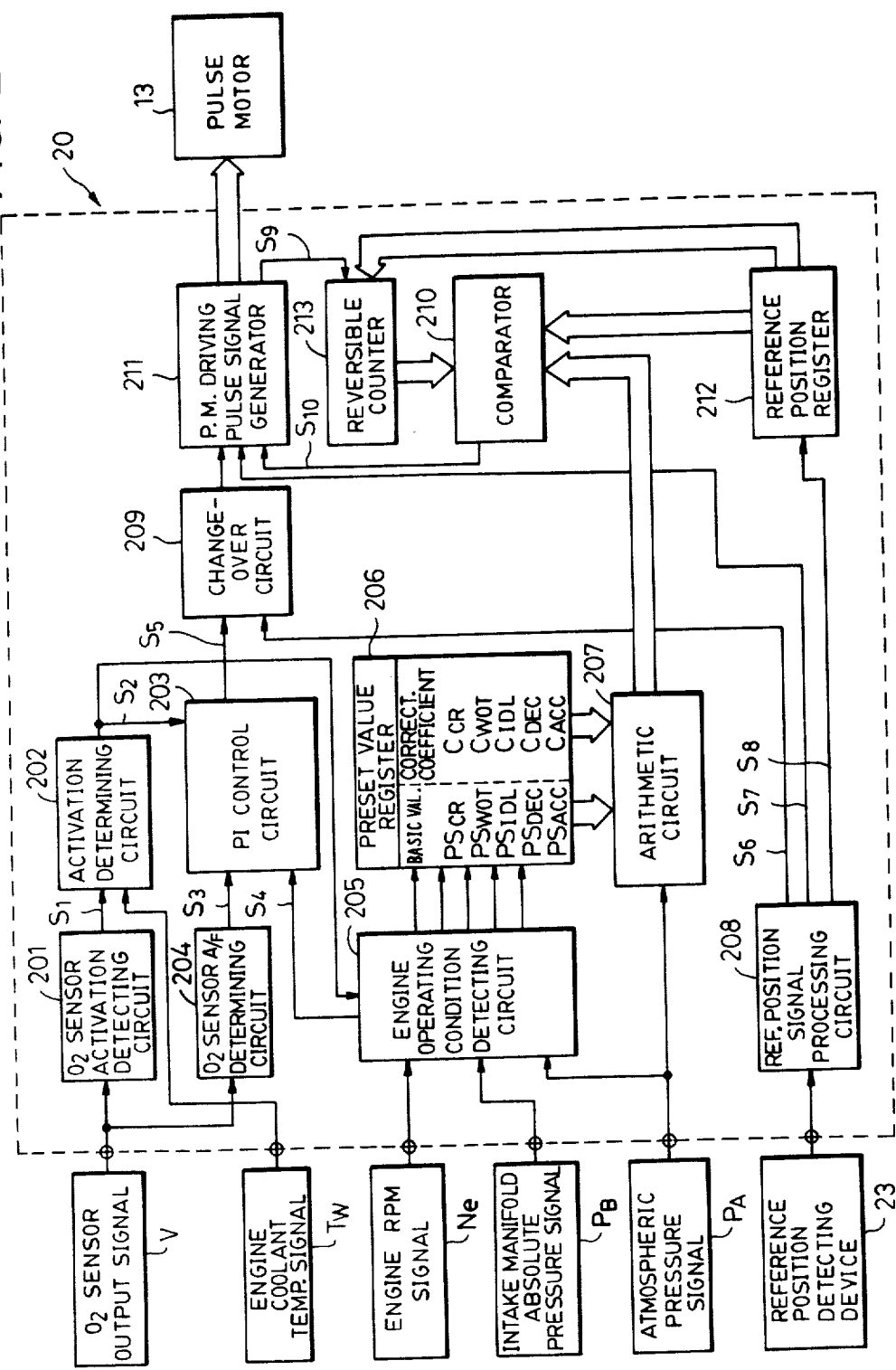
FIG. 2 is a block diagram illustrating the whole arrangement of an electrical circuit provided in an electronic control unit (ECU) in FIG. 1 for performing the air/fuel ratio control according to the present invention.

FIG. 2 is a block diagram illustrating the interior construction of ECU 20 used in the air/fuel ratio control system having the above-mentioned functions according to the invention. In ECU 20, reference numeral 201 designates a circuit for detecting the activation of the $O_2$ sensor 28, which is supplied at its input with an output signal V from the $O_2$ sensor. Upon passage of the predetermined period of time Tx after the voltage of the above output signal V has dropped below the predetermined value Vx, the above circuit 201 supplies an activation signal $S_1$ to an activation determining circuit 202. This activation determining circuit 202 is also supplied at its input with an engine coolant temperature signal Tw from the thermistor 29 in FIG. 1. When supplied with both the above activation signal $S_1$ and the coolant temperature signal Tw indicative of a value exceeding the predetermined value Twx, the activation determining circuit 202 supplies an air/fuel ratio control initiation signal $S_2$ to a PI control circuit 203 to render same ready to operate. Reference numeral 204 represents an air/fuel ratio determining circuit which determines the value of air/fuel ratio of engine exhaust gases, depending upon whether or not the output voltage of the $O_2$ sensor 28 is larger than the predetermined value Vref, to supply a binary signal $S_3$ indicative of the value of air/fuel ratio thus obtained, to the PI control circuit 203. On the other hand, an engine condition detecting circuit 205 is provided in ECU 20, which is supplied with an engine rpm signal Ne from the engine rpm sensor 50, 51, an absolute pressure signal $P_B$ from the pressure sensor 54, an atmospheric pressure signal $P_A$ from the atmospheric pressure sensor 56, all the sensors being shown in FIG. 1, and the above control initiation signal $S_2$ from the activation determining circuit 202 in FIG. 2, respectively. The circuit 205 supplies a control signal $S_4$ indicative of a value corresponding to the values of the above input signals to the PI control circuit 203. The PI control circuit 203 accordingly supplies to a change-over circuit 209 to be referred to later a pulse motor control signal $S_5$ having a value corresponding to the air/fuel ratio signal $S_3$ from the air/fuel ratio determining circuit 204 and a signal component corresponding to the engine rpm Ne in the control signal $S_4$ supplied from the engine condition detecting circuit 205. The engine condition detecting circuit 205 also supplies to the PI control circuit 203 the above control signal $S_4$ containing a signal component corresponding to the engine rpm Ne, the absolute pressure $P_B$ in the intake manifold, atmospheric pressure $P_A$ and the value of air/fuel ratio control initiation signal $S_2$. When supplied with the above signal component from the engine condition detecting circuit 205, the PI control circuit 203 interrupts its own operation. Upon interruption of the supply of the above signal component to the control circuit 203, a pulse signal $S_5$ is outputted from the circuit 203 to the change-over circuit 209, which signal starts air/fuel ratio control with integral term correction. A preset value register 206 is provided in ECU 20, in which are stored the basic values of preset values $PS_{CR}$, $PS_{WOT}$, $PS_{IDL}$, $PS_{DEC}$ and $PS_{ACC}$ for the pulse motor position, applicable to various engine conditions, and atmospheric pressure correcting coefficients $C_{CR}$, $C_{WOT}$, $C_{IDL}$, $C_{DEC}$ and $C_{ACC}$ for these basic values. The engine condition detecting circuit 205 detects the operating condition of the engine based upon the activation of the $O_2$ sensor and the values of engine rpm Ne, intake manifold absolute pressure $P_B$ and atmospheric pressure $P_A$ to read from the register 206 the basic value of a preset value corresponding to the detected operating condition of the engine and its corresponding correcting coefficient and apply same to an arithmetic circuit 207. The arithmetic circuit 207 performs arithmetic operation responsive to the value of the atmospheric pressure signal $P_A$, using the equation $PSi(P_A) = PSi + (760 - P_A) \times Ci$. The resulting present value is applied to a comparator 210.

On the other hand, a reference position signal processing circuit 208 is provided in ECU 20, which is responsive to the output signal of the reference position detecting device (reed switch) 23, indicative of the switching of same, to produce a binary signal $S_6$ having a certain level from the start of the engine until it is detected that the pulse motor reaches the reference position. This binary signal $S_6$ is supplied to the change-over circuit 209 which in turn keeps the control signal $S_5$ from being transmitted from the PI control circuit 203 to a pulse motor driving signal generator 211 as long as it is supplied with this binary signal $S_6$, thus avoiding the interference of the operation of setting the pulse motor to the initial position with the operation of P-term/I-term control. The reference position signal processing circuit 208 also produces a pulse signal $S_7$ in response to the output signal of the reference position detecting device 23, which signal causes the pulse motor 13 to be driven in the step-increasing direction or in the step-decreasing direction so as to detect the reference position of the pulse motor 13. This signal $S_7$ is supplied directly to the pulse motor driving signal generator 211 to cause same to drive the pulse motor 13 until the reference position is detected. The reference position signal processing circuit 208 produces another pulse signal $S_8$ each time the reference position is detected. This pulse signal $S_8$ is supplied to a reference position register 212 in which the value of the reference position (e.g., 50 steps) is stored. This register 212 is responsive to the above signal $S_8$ to apply its stored value to one input terminal of the comparator 210 and to the input of a reversible counter 213. The reversible counter 213 is also supplied with an output pulse signal $S_9$ produced by the pulse motor driving signal generator 211 to count the pulses of the signal $S_9$ corresponding to the actual position of the pulse motor 13. When supplied with the stored value from the reference position register 212, the counter 213 has its counted value replaced by the value of the reference position of the pulse motor.

The counted value thus renewed is applied to the other input terminal of the comparator 210. Since the comparator 210 has its other input terminal supplied with the same pulse motor reference position value, as noted above, no output signal is supplied from the comparator 210 to the pulse motor driving signal generator 211 to thereby hold the pulse motor at the reference position with certainty. Subsequently, when the $O_2$ sensor 28 remains deactivated, an atmospheric pressure-compensated preset value $PS_{CR}(P_A)$ is outputted from the arithmetic circuit 207 to the one input terminal of the comparator 210 which in turn supplies an output signal $S_{10}$ corresponding to the difference between the preset value $PS_{CR}(P_A)$ and a counted value supplied from the reversible counter 213, to the pulse motor driving signal generator 211, to thereby achieve accurate control of the position of the pulse motor 13. Also, when the other open loop control conditions are detected by the engine condition detecting circuit 205, similar operations to that just mentioned above are carried out.

Figure 3:
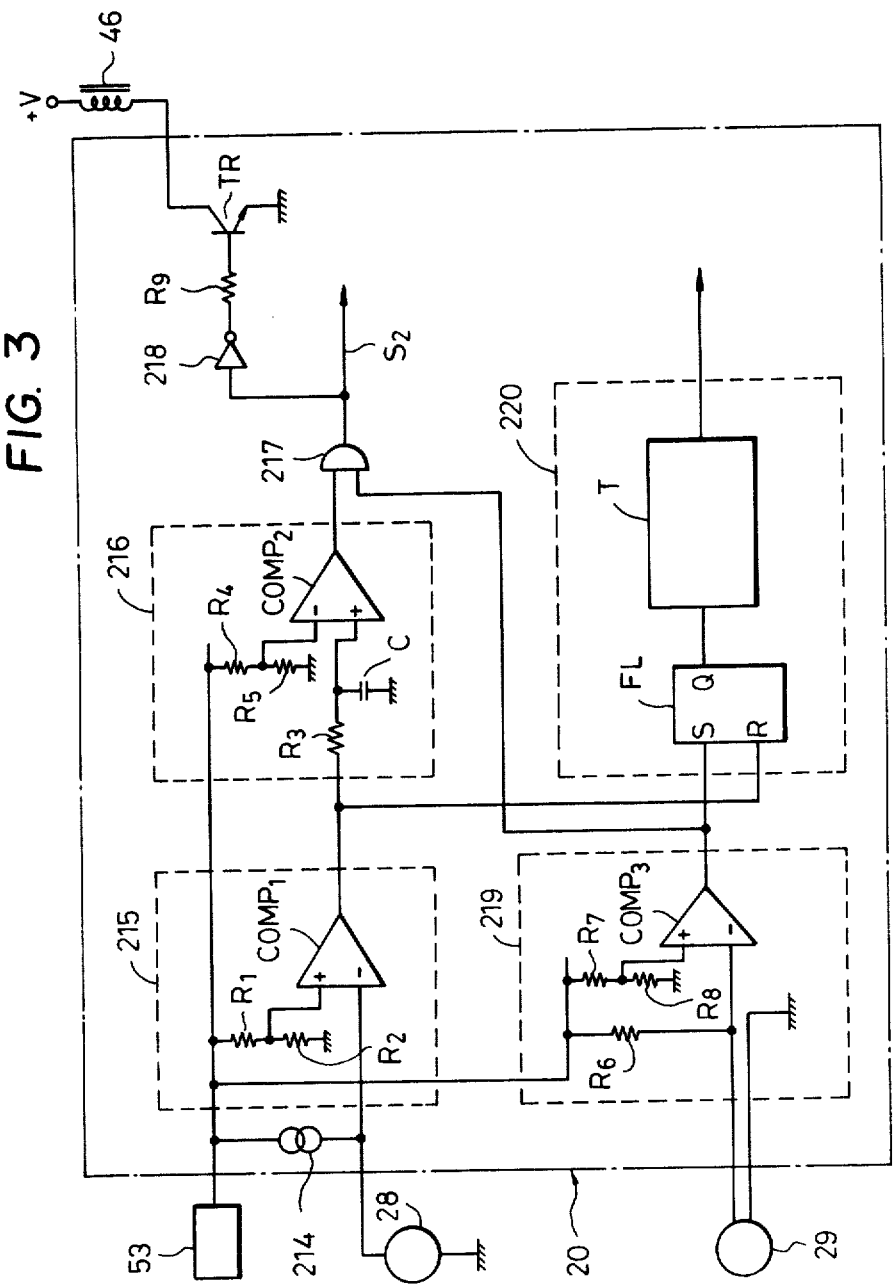
FIG. 3 is a circuit diagram illustrating an electrical circuit provided in an electronic control unit (ECU) in FIG. 1 for performing detection of the timing of initiation of the air/fuel ratio control, etc.

FIG. 3 illustrates an electrical circuit provided in ECU 20 for detecting the timing of initiation of the air/fuel ratio control operation of the invention previously described, and performing a fail safe function in the event of a failure in the $O_2$ sensor, etc.

Connected between the $O_2$ sensor 28 and the power supply 53, both shown in FIG. 1, is a constant-current circuit 214 which supplies the $O_2$ sensor 28 with current at a constant rate. Reference numeral 215 designates a circuit for determining the internal resistance of the $O_2$ sensor 28, which is comprised of a voltage divider formed of resistances $R_1$, $R_2$ connected in series between the power supply 53 and the ground, and a comparator $COMP_1$ which has its non-inverting input terminal connected to the junction of the resistance $R_1$ with the resistance $R_2$ and its inverting input terminal to the junction of the constant-current circuit 214 with the $O_2$ sensor 28, respectively. The voltage at the junction of the resistance $R_1$ with the resistance $R_1$ is used as the aforementioned predetermined voltage Vx and is set at a rather high value, e.g., 0.5 volt. Connected to the output of the internal resistance determining circuit 215 is a signal delaying timer circuit 216 in which a comparator $COMP_2$ has its non-inverting input terminal connected to the output terminal of the comparator $COMP_1$ by way of a time constant circuit formed of a resistance $R_3$ and a capacitor C. The comparator $COMP_2$ has its inverting input terminal connected to the junction of a resistance $R_4$ with a resistance $R_5$, the resistances $R_4$, $R_5$ being connected in series between the power supply 53 and the ground and forming a voltage devider. The comparator $COMP_2$ has its output connected to one input terminal of an AND circuit 217 which in turn has its output connected to the base of an NPN transistor TR by way of an inverter 218 and a resistance $R_9$. This transistor TR has its emitter grounded and its collector connected to the solenoid 46 of the solenoid valve 39 for control of the secondary air supply valve 30 in FIG. 1, which solenoid in turn is connected to a positive voltage power supply, not shown. With the above arrangement, when no output is produced by the AND circuit 217, the transistor TR is on due to the presence of the inverter 218, to have the solenoid 46 energized so that the secondary air supply valve 30 is in an operative state to allow air to be supplied into the exhaust manifold.

On the other hand, the thermistor 29 in FIG. 1 is connected to an engine temperature determining circuit 219. In the circuit 219, the thermistor 29 has its output connected to the power supply 53 by way of a resistance $R_6$ and also to the inverting input terminal of a comparator $COMP_3$. The comparator $COMP_3$ has its non-inverting input terminal connected to the junction of a resistance $R_7$ with a resistance $R_8$, the resistances $R_7$, $R_8$ being connected in series between the power supply 53 and the ground and forming a voltage devider. The voltage at the junction between the resistances $R_7$, $R_8$ is set at a value equal to the terminal voltage of the thermistor 29 which is obtained when the thermistor 29 has a temperature equal to the predetermined temperature Twx (e.g., 35° C.) for the engine cooling water. The comparator $COMP_3$ has its output connected to the other input terminal of the AND circuit 217 and the S-input terminal of an RS flip flop FL which forms part of a failure determining circuit 220. The flip flop has its R-input terminal connected to the output of the comparator $COMP_1$ of the internal resistance determining circuit 215 and its output to the input of a timer circuit T, respectively.

The operation of the electrical circuit of FIG. 3 constructed as above will now be described. When the $O_2$ sensor 28 is not yet activated at the start of the engine, its output voltage is higher than the potential (0.5 volt) at the junction of the resistance $R_1$ with the resistance $R_2$ so that the comparator $COMP_1$ produces a low level output. As the $O_2$ sensor becomes activated to have its output voltage decreased below 0.5 volt, the comparator $COMP_1$ produces a high level output which is then applied to the time constant circuit $R_3$, C of the timer circuit 216. When a predetermined period of time (e.g., 1 minute) corresponding to the time constant of the time constant circuit lapses after application of the above high level output thereto, the voltage at the junction of the resistance $R_3$ with the capacitor C rises to a value exceeding the voltage at the junction of the resistance $R_4$ with the resistance $R_5$ so that the comparator $COMP_2$ produces a high level output which is then applied to the one input terminal of the AND circuit 217.

On the other hand, the thermistor 29, which has a negative temperature coefficient, that is, has its internal resistance decreasing with a rise in its temperature, has its terminal voltage higher than the potential at the junction of the resistance $R_7$ with the resistance $R_8$ at the start of the engine when the engine cooling water temperature Tw is low, so that the output voltage level of the comparator $COMP_3$ is low. Subsequently, when the cooling water temperature Tw rises to exceed a predetermined value (e.g., 35° C.) due to warming-up operation of the engine, the terminal voltage of the thermistor 29 drops below the potential at the junction between the resistances $R_7$, $R_8$ so that the output voltage level of the comparator $COMP_3$ becomes high. This high level output is applied to the other input terminal of the AND circuit 217. On this occasion, as previously noted, the AND circuit 217 has its one input terminal supplied with the high level output from the timer circuit 216 so that it produces a high level output which is then applied as the activation signal $S_2$ to the PI control circuit 203 in FIG. 2. The same output of the AND circuit 217 is simultaneously applied to the transistor TR through the inverter 218 and the resistance $R_9$ to turn it off, to cause deenergization of the solenoid 46 of the solenoid valve 39 in FIG. 1. Thus, the secondary air supply valve 30 is rendered inoperative to cause interruption of the supply of air into the exhaust manifold 27.

On the other hand, the outputs of the activation determining circuit 215 and the engine temperature determining circuit 219 are applied to the R-input terminal and S-input terminal of the flip flop FL, respectively. If the output of the engine temperature determining circuit 219 is at a high level and simultaneously the output of the $O_2$ sensor activation determining circuit 215 is at a low level, the flip flop FL supplies a high level output through its output terminal Q to the timer T. After this supply of the high level output to the timer T has been continued for a predetermined period of time (e.g., 10 minutes), the timer T produces an output which is used as a signal indicative of failure of the $O_2$ sensor 28 or its related parts, for carrying out a suitable fail safe function.

By virtue of employment of the above circuit arrangement for determining the air/fuel ratio control initiating timing in the air/fuel ratio control system according to the invention, the following excellent effects can be obtained:

(1) Setting of the predetermined voltage Vx for comparison with the $O_2$ sensor output voltage at a high value and provision of the timer circuit 216 enable to achieve highly accurate and reliable detection of the activation of the $O_2$ sensor. Setting of the above voltage Vx at a very small value would permit omission of the timer circuit 216. However, in the actual circuit involving the $O_2$ sensor, the smaller the terminal voltage of the $O_2$ sensor is, the smaller the rate of change in the same terminal voltage with respect to time is, so that if the reference voltage Vx is set at a small value, there can be large errors in the timing of change of the output level of the comparator $COMP_1$ from the actual timing of activation of the $O_2$ sensor, during warming-up of the engine. Further, since the reference voltage Vx is thus set at a small value, the circuit concerned can be much influenced by noise and other detrimental factors, making it impossible to detect the $O_2$ sensor activation timing with a high degree of accuracy and reliability. For these reasons, according to the invention, the reference voltage Vx is set at such a high value as to enable highly accurate detection of the timing of the O₂ sensor activation. Thus, the activation of the O₂ sensor is detected at an early time, and the activation signal S₂ is made available with a suitable delay by providing the timer circuit 216.

(2) Provision of the engine temperature determining circuit 219 enables achievement of good driveability of the engine at the start of the engine and accurate performance of the fail safe function. More specifically, while the O₂ sensor is activated by the heat of the exhaust gases of the engine, the engine temperature Tw often has not yet increased to the predetermined value Twx at which the automatic choke is opened to an opening which enables carrying out the feedback control operation, at the time of the activation of the O₂ sensor being detected by the circuits 215, 216. In such case, if the air/fuel ratio feedback control is initiated, a mixture having an air/fuel ratio equal to or close to the theoretical value cannot be supplied to the engine, and further, the resulting air/fuel ratio is larger than the value to be achieved by the choke valve, that is, the choke valve cannot exhibit its proper function, thus resulting in inferior driveability.

Furthermore, since the engine temperature determining circuit 219 is provided so as for the condition of performing the fail safe function in the event of failure of the O₂ sensor to include the requirement that the engine temperature Twx, the phenomenon can be avoided that the fail safe circuit is actuated under a particular engine operating condition even when the O₂ sensor properly operates, thus ensuring accurate performance of the fail safe function.

Incidentally, although in the FIG. 1 embodiment a read valve is used as the means for supplying secondary air to the exhaust manifold, such means is not limited to the reed valve, but a pump unit may be used as such secondary air supply means, for instance.

What is claimed is:

1. In an air/fuel ratio control system for performing feedback control of the air/fuel ratio of an air/fuel mixture being supplied to an internal combustion engine having an exhaust system, the control system including a three-way catalyst provided in said exhaust system of said engine, an O₂ sensor arranged between said engine and said three-way catalyst for detecting the concentration of oxygen present in exhaust gases emitted from said engine, fuel quantity adjusting means for producing said mixture being supplied to said engine, and electrical circuit means operatively connecting said O₂ sensor with said fuel quantity adjusting means in a manner effecting feedback control operation in response to an output voltage produced by said O₂ sensor to control the air/fuel ratio of said mixture to a preset value, the combination comprising: means for supplying electric current to said O₂ sensor; means for determining the internal resistance of said O₂ sensor, said internal resistance determining means being operable to compare an output voltage produced by said O₂ sensor with a predetermined reference voltage to produce an output when said output voltage of said O₂ sensor decreases below said predetermined reference voltage; a timer circuit connected to said internal resistance determining means for producing an output after a lapse of a predetermined period of time from the occurrence of said output of said internal resistance determining means; means for detecting the temperature of said engine; an engine temperature determining circuit connected to said engine temperature detecting means for producing an output when the engine temperature detected by said latter means increases above a predetermined value; and signal generating means connected to said timer circuit and said engine temperature determining means for producing a signal for initiating said feedback control operation when supplied with both of said outputs from said latter two means.

2. The air/fuel ratio control system as claimed in claim 1, further comprising means arranged in communication with said exhaust system of said engine at a location upstream of said O₂ sensor for supplying secondary air thereto, said secondary air supply means being electrically connected to said signal generating means to be rendered inoperative by said feedback control initiating signal supplied thereto from said latter means.

3. The air/fuel ratio control system as claimed in claim 1, further comprising a failure determining circuit connected to said O₂ sensor internal resistance determining circuit and said engine temperature determining circuit, for producing an output after said engine temperature determining circuit has continued producing said output thereof for a predetermined period of time when no output is produced by said O₂ sensor internal resistance determining circuit.

* * * * *